(12) United States Patent
May et al.

(10) Patent No.: US 6,361,457 B1
(45) Date of Patent: Mar. 26, 2002

(54) VARIABLE SPEED PULLEY ASSEMBLY

(75) Inventors: Leonhard May, North Royalton; Reinhardt Willesch, Brunswick; Gerhard Plamper, North Royalton, all of OH (US)

(73) Assignees: May Tool & Die, Inc.; Plymar, Ltd., both of North Royalton, OH (US)

( * ) Notice: Subject to any disclaimer, the term of this patent is extended or adjusted under 35 U.S.C. 154(b) by 0 days.

(21) Appl. No.: 09/537,601

(22) Filed: Mar. 29, 2000

(51) Int. Cl.[7] .............................. F16H 9/16; F16H 55/56
(52) U.S. Cl. ............................................. 474/32; 474/33
(58) Field of Search ........................... 474/8, 9, 10, 11, 474/12, 13, 14, 15, 16, 17, 18, 19, 20, 21, 22, 23, 24, 25, 32, 33, 38, 43, 199; 38/547; 248/633

(56) References Cited

U.S. PATENT DOCUMENTS

| | | | |
|---|---|---|---|
| 2,186,477 A | * 1/1940 | Coddington | 474/32 X |
| 4,422,227 A | * 12/1983 | Illg | 474/32 |
| 4,857,033 A | * 8/1989 | Czarka | 474/14 |
| 4,941,863 A | 7/1990 | Sampei et al. | 474/33 |
| 5,725,448 A | * 3/1998 | Kato et al. | 474/199 X |
| 5,897,450 A | 4/1999 | May | 474/32 |

* cited by examiner

Primary Examiner—David A. Bucci
Assistant Examiner—Colby Hansen
(74) Attorney, Agent, or Firm—Tarolli, Sundheim, Covell, Tummino & Szabo L.L.P.

(57) ABSTRACT

A variable speed pulley assembly (10) for use with a drive belt (30) having a V-shaped cross-sectional configuration for transmitting driving force to the pulley assembly and a driven belt (32) having a V-shaped cross-sectional configuration for transmitting force driving force from the pulley assembly. The pulley assembly (10) includes a plurality of pulley halves (90–98) which are welded to a constant diameter portion (62) of a shaft (50). The shaft (50) rotates about its axis (44) to enable the pulley halves (90–98) to rotate. A sleeve (120) on the constant diameter portion (62) of the shaft (50) is movable axially in opposite directions along the shaft. The center pulley (94) is fixed for rotation with the sleeve (120). The first ratio of the length of the sleeve (120) to its diameter is at least 1 to 1. The ratio of the outer diameter of the drive belt (30) on its pulley, to the first ratio, is preferably less than 4 to 1.

22 Claims, 2 Drawing Sheets

VARIABLE SPEED PULLEY ASSEMBLY

BACKGROUND OF THE INVENTION

The present invention relates to a variable speed pulley assembly. In particular, the present invention relates to a variable speed clutch or variable speed pulley assembly for use in a lawn tractor or garden tractor to vary the drive speed of the tractor while the engine speed remains constant. U.S. Pat. No. 5,897,450, the entire disclosure of which is incorporated herein by reference, discloses such a pulley assembly. Another variable speed pulley assembly is disclosed in U.S. Pat. No. 4,941,863.

SUMMARY OF THE INVENTION

The present invention is a variable speed pulley assembly for use with a drive belt having a V-shaped cross-sectional configuration for transmitting driving force to the pulley assembly and a driven belt having a V-shaped cross-sectional configuration for transmitting force driving force from the pulley assembly. The pulley assembly is supported on a support member. The pulley assembly comprises a shaft supporting the pulley assembly on the support member for rotation relative to the support member about an axis. An outer drive pulley half is fixed for rotation with the shaft on a first portion of the shaft having a first diameter. An outer driven pulley half is fixed for rotation with the shaft on a second portion of the shaft spaced apart axially from the first portion and having the first diameter.

A bushing is on a third portion of the shaft axially intermediate the outer drive pulley half and the outer driven pulley half. The bushing is movable axially in opposite directions along the third portion of the shaft between the outer drive pulley half and the outer driven pulley half. The third portion of the shaft has the first diameter. A center pulley is fixed for rotation with the bushing. The center pulley comprises an inner drive pulley half and an inner driven pulley half fixed for rotation with each other. The center pulley is rotatable with the outer drive pulley half and the outer driven pulley half about the axis.

The inner drive pulley half and the outer drive pulley half define between them a drive pulley groove. The drive belt is received in the drive pulley groove and is movable radially in the drive pulley groove between a radially innermost position and a radially outermost position. The inner driven pulley half and the outer driven pulley half define between them a driven pulley groove. The driven belt is received in the driven pulley groove and is movable radially in the driven pulley groove between a radially innermost position and a radially outermost position.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EMBODIMENTS OF THE INVENTION

Figure 1:
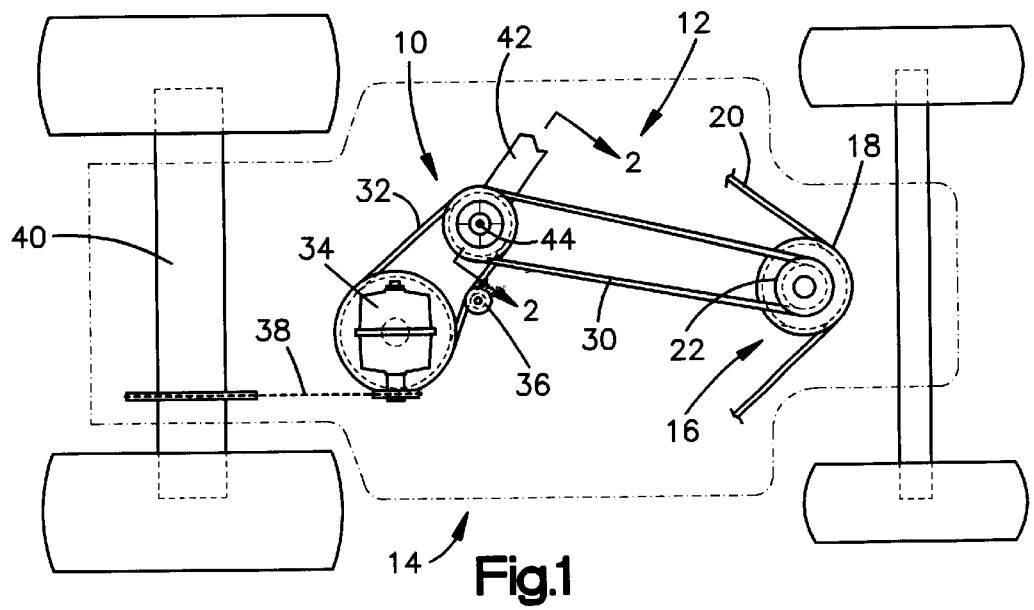
FIG. 1 is a schematic view of a tractor drive train which includes a variable speed pulley assembly constructed in accordance with the present invention.

The present invention relates to a variable speed pulley assembly. In particular, the present invention relates to a variable speed clutch and/or variable speed pulley assembly for use in a lawn tractor or garden tractor to vary the drive speed of the tractor while the engine speed remains constant. As representative of the present invention, FIG. 1 illustrates schematically a variable speed pulley assembly 10 constructed in accordance with the present invention.

The pulley assembly 10 is incorporated in the drive train 12 of a tractor 14. The drive train 12 includes an engine output pulley 16. One portion 18 of the engine output pulley 16 drives a belt 20 which drives an accessory such as grass cutting blades (not shown) of the tractor 14.

Another portion 22 of the engine output pulley 16 drives a drive belt 30. The drive belt 30 is connected in a force-transmitting relationship, by the pulley assembly 10, to a driven belt 32. The driven belt 32 drives a transmission 34 of the tractor. The driven belt 32 is maintained in tension by an idler pulley 36.

The transmission 34 is connected through a drive chain 38 to a rear axle assembly 40 of the tractor 14. As a result, rotation of the engine output pulley 16, upon operation of the tractor's engine (not shown), causes the tractor 14 to be driven along the ground surface.

The pulley assembly 10 is supported in a manner described below on a support arm 42, for rotation about an axis 44. The support arm 42 (FIG. 2) includes a first portion 46 and a second portion 48. The support arm 42 is movable in a known manner, in opposite directions transverse to the axis 44, to move the pulley assembly 10 radially relative to the axis. Such movement results in a change in the speed ratio between the drive belt 30 and the driven belt 32. This change results in a change in the speed of the tractor 14 over the ground surface.

The pulley assembly 10 (FIG. 2) includes a shaft 50. The shaft 50 is formed as one piece, preferably by machining. The shaft 50 has an elongate, cylindrical configuration centered on the axis 44.

The shaft 50 has a first portion 52 having a first diameter. The first portion 52 has first and second end portions 54 and 56. An internally threaded opening 58 is formed in the first end portion 54 of the first portion 52 of the shaft. An annular shoulder surface 60 extends radially outward from the second end portion 56 of the first portion 52 of the shaft 50.

The shaft 50 has a second portion 62, which is larger in diameter than the first diameter 52. The second portion 62 of the shaft 50 has a constant diameter for its entire length. A frustoconical surface 64 of the shaft 50 tapers from the second portion 62 to the shoulder surface 64.

The first portion 52 of the shaft 50 is engaged by and supported in first and second ball bearings 66 and 68. The first bearing 66 has an inner race 70 and an outer race 72. The second bearing 68 has an inner race 74 and an outer race 76.

The outer race 72 of the first bearing 66 is clamped in the first portion 46 of the support arm 42. The outer race of the second bearing 68 is clamped in the second portion 48 of the support arm 42. The first and second bearings 66 and 68 are thereby fixed for movement with the support arm 42.

The shoulder surface 60 on the shaft 50 abuttingly engages the inner race 74 of the second bearing 68. A sleeve 80 is disposed on the first portion 52 of the shaft 50, between the inner races 70 and 74 of the bearings 66 and 68, respectively. A bolt 82 is threaded into the opening 58 in the first end portion 54 of the first portion 52 of the shaft 50. The head of the bolt 82 urges a washer 84 into engagement with the inner race 74 of the second bearing 68.

When the bolt 82 is tightened in the shaft 50, a clamping force is exerted between the shoulder surface 60 on the shaft 50 and the head of the bolt 82. The clamping force secures the first portion 52 of the shaft 50 for rotation with the inner races 70 and 74 of the bearings 66 and 68, respectively. As a result, the entire shaft 50 is supported in the support arm 42 for rotation relative to the support arm, about the axis 44.

The pulley assembly 10 also includes an outer drive pulley half 90, an outer driven pulley half 92, and a center pulley 94. The center pulley 94 includes an inner drive pulley half 96 and an inner driven pulley half 98. The outer and inner drive pulley valves 90 and 96, together, make up a drive pulley which receives the drive belt 30. The outer and inner driven pulley halves 92 and 98, together, make up a driven pulley which receives the driven belt 32.

The outer drive pulley half 90 is fixed to the second portion 62 of the shaft 50 for rotation with the shaft, preferably by welding as indicated at 99. The outer drive pulley half 90 is a single piece of sheet metal, preferably galvanized steel, which is stamped and formed to the generally circular configuration shown in cross-section in FIG. 2. The outer drive pulley half 90 has a configuration as shown in the aforementioned U.S. Pat. No. 5,897,450, the disclosure of which is incorporated herein by reference.

Specifically, the outer drive pulley half 90 includes a main body portion 100 having a generally conical configuration. The main body portion 100 has a belt engagement surface 102 which is presented axially inward of the pulley assembly 10, that is, in a direction toward the inner drive pulley half 96.

The belt engagement surface 102 of the main body portion 100 has three distinct sections. A radially inner section 104 of the belt engagement surface 102 is configured as a frustum of a right circular cone centered on the axis 44. The inner section extends 104 at an angle of about 75° to the axis 44, that is, at an angle of about 15° to a plane perpendicular to the axis. The inner section 104 covers about the radially inner one third of the main body portion 100 of the outer drive pulley half 90.

A radially intermediate section 106 of the belt engagement surface 102, disposed radially outward of the inner section 104, is configured as a frustum of a right circular cone centered on the axis 44. The intermediate section 106 extends at an angle of about 78° to the axis 44, that is, at an angle of about 12° to a plane perpendicular to the axis. The intermediate section 106 covers about the radially central one third of the main body portion 100 of the outer drive pulley half 90.

A radially outer section 108 of the belt engagement surface 102, disposed radially outward of the intermediate section 106, is configured as a frustum of a right circular cone centered on the axis 44. The outer section 108 extends at an angle of about 81.5° to the axis 44, that is, at an angle of about 8.50 to a plane perpendicular to the axis. The outer section 108 covers about the radially outer one third of the main body portion 100 of the outer drive pulley half 90.

The outer driven pulley half 92 is fixed to the second portion 62 of the shaft 50 for rotation with the shaft, preferably by welding as indicated at 109. The outer driven pulley half 92 is a single piece of sheet metal, preferably galvanized steel, which is stamped and formed to the generally circular configuration shown in cross-section in FIG. 2. The outer driven pulley half 92 is a mirror image of the outer drive pulley half 90. The outer driven pulley half 92 has a configuration as shown in the aforementioned U.S. Pat. No. 5,897,450, the disclosure of which is incorporated herein by reference. Specifically, a main body portion 110 of the outer driven pulley half 92 has a three-sectioned configuration as described above with reference to the outer drive pulley half 90.

The pulley assembly 10 (FIG. 2) includes a bushing or sleeve 120 supported on the shaft 50 for rotation relative to the shaft. The sleeve 120 is preferably made from powder metal. The sleeve 120 has a cylindrical configuration including parallel, cylindrical inner and outer side surfaces 122 and 124 centered on the axis 44.

The sleeve 120 is slidable axially on the second portion 62 of the shaft 50, in opposite directions between the axially fixed outer drive pulley half 90 and the axially fixed outer driven pulley half 92. The sleeve 120 is also rotatable on the second portion 62 of the shaft 50, about the axis 44. The portion of the shaft 50 on which the sleeve 120 is located has the same diameter as the portions of the shaft on which the outer drive pulley half 90 and the outer driven pulley half 92 are located.

The inner drive pulley half 96 and the inner driven pulley half 98, which together form the center pulley 94, are fixed to each other and to the sleeve 120. As a result, the center pulley 94 is slidable axially on the second portion 62 of the shaft 50, in opposite directions between the axially fixed outer drive pulley half 90 and the axially fixed outer driven pulley half 92.

The inner drive pulley half 96 has a main body portion 134 which is a mirror image of the main body portion 100 of the outer drive pulley half 90. The main body portion 134 of the inner drive pulley half 96 has a belt engagement surface 140 which is presented toward, or faces, the inner surface 102 of the main body portion 100 of the outer drive pulley half 90. The belt engagement surface 140 of the inner drive pulley half 96 is a mirror image of the belt engagement surface 102 of the outer drive pulley half 90. The belt engagement surface 140 of the inner drive pulley half 96, and the belt engagement surface 102 of the outer drive pulley half 90, define between them a variable width drive pulley groove 141.

Specifically, the belt engagement surface 140 of the inner drive pulley half 96 includes three distinct sections. A radially inner section 142 is configured as a frustum of a right circular cone centered on the axis 44. The inner section 142 extends at an angle of about 75° to the axis 44, that is, at an angle of about 15° to a plane perpendicular to the axis. The inner section 142 covers about one third of the radial extent of the main body portion 134 of the inner drive pulley half 96.

A radially intermediate section 144 of the belt engagement surface 140 is configured as a frustum of a right circular cone centered on the axis 44. The intermediate section 144 extends at an angle of about 78° to the axis 44, that is, at an angle of about 12° to a plane perpendicular to the axis. The intermediate section 144 covers about one third of the radial extent of the main body portion 134 of the inner drive pulley half 96.

A radially outer section 146 of the belt engagement surface 140 is configured as a frustum of a right circular cone centered on the axis 44. The outer section 146 extends at an angle of about 81.5° to the axis 44, that is, at an angle of about 8.5° to a plane perpendicular to the axis. The outer section 146 covers about one third of the radial extent of the main body portion 134 of the inner drive pulley half 96.

The inner driven pulley half 98 has a main body portion 150 which is a mirror image of the main body portion 110 of the outer driven pulley half 92. The main body portion 150 has a three-sectioned configuration as described above. The inner driven pulley half 98 and the outer driven pulley half 92 define between them a variable width drive pulley groove 154.

The operation of the pulley assembly 10 is substantially similar to the operation of the pulley assembly in the aforementioned U.S. Pat. No. 5,897,450. Specifically, when the center pulley 94 is in a position (not shown) shifted axially closest to the outer drive pulley half 90 and farthest from the outer driven pulley half 92—that is, to the left as viewed in FIG. 2, the drive train 12 is in a low torque, high speed condition. The drive belt 30 is in a radially inward position in the drive pulley groove 141 in the pulley assembly. The driven belt 32 is in a radially outward position in the driven pulley groove 154 in the pulley assembly 10.

Figure 2:
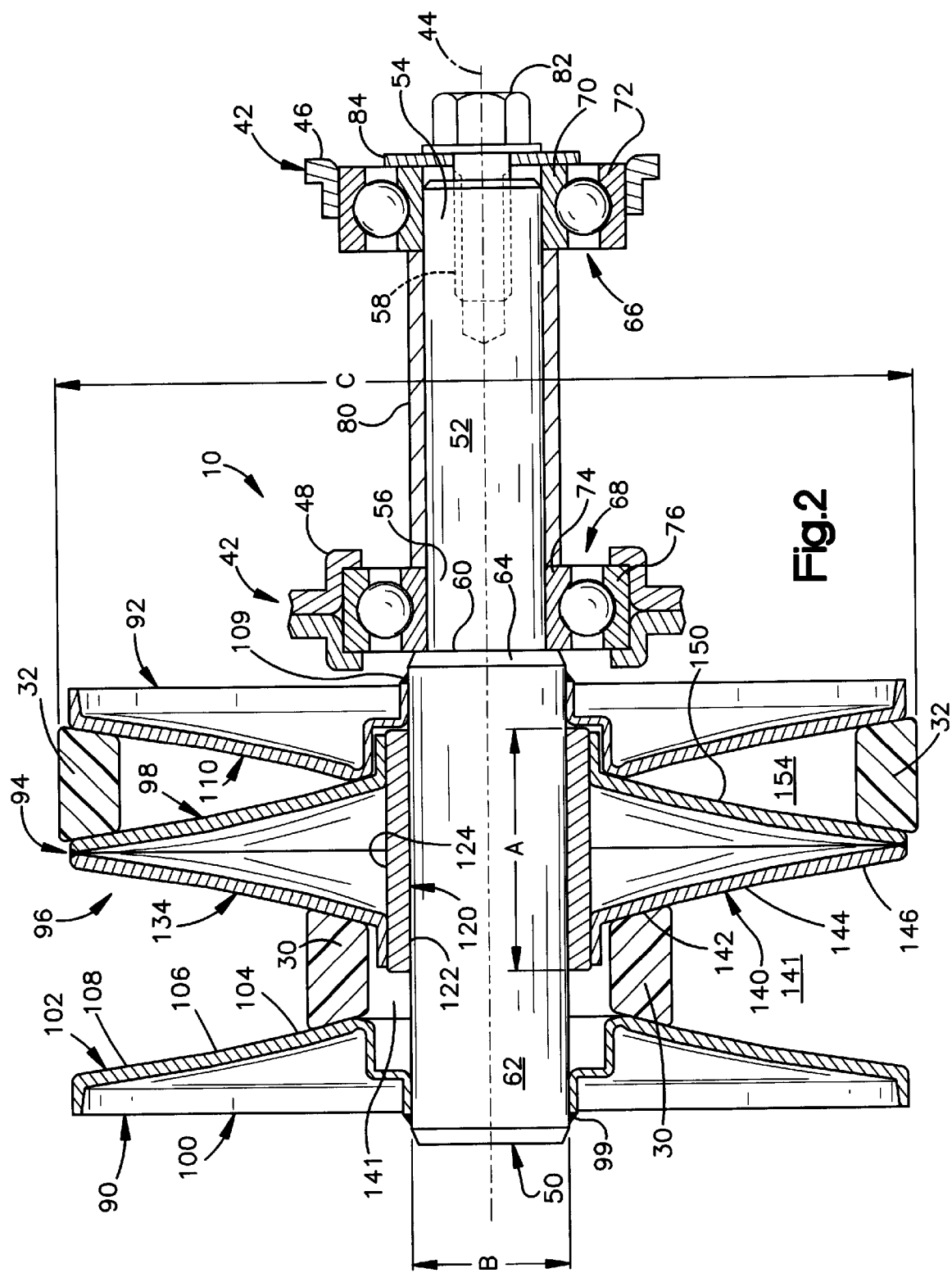
FIG. 2 is a sectional view of the pulley assembly of FIG. 1.

Upon movement of the arm 46 in a first direction transverse to the axis 44 of rotation of the pulley assembly 10, the center pulley 94 moves axially in a direction away from the outer drive pulley half 90 and toward the outer driven pulley half 92 (from left to right as viewed in FIG. 2). Such movement results in a change in the speed ratio between the drive belt 30 and the driven belt 32. In this condition, the pulley assembly 10 is in a medium torque, medium speed condition. The speed ratio between the drive belt 30 and the driven belt 32 is decreased from the starting condition; the driven belt moves faster for each degree of movement of the drive belt. The speed of the tractor 14 over the ground surface increases.

Upon continued movement of the arm 46 in the first direction transverse to the axis 44 of rotation of the pulley assembly 10, the center pulley 94 (FIG. 2) moves axially into engagement with the outer driven pulley half 92 as shown in FIG. 2. In this condition, the pulley assembly 10 is in a low torque, high speed condition. The speed ratio between the drive belt 30 and the driven belt 32 is at its least; the driven belt moves fastest for each degree of movement of the drive belt. The speed of the tractor 10 over the ground surface is at its greatest.

The shaft 50 rotates in the bearings 66 and 68 in the support arm 42. The pulley halves 90 and 92 are fixed, preferably by welding, to the shaft 50. As a result, no bearings are needed on the second portion 62 of the shaft 50, which supports the pulley halves 90, 92 and 94. This means that the radially inner portions of the pulley halves 90, 92, and 94 can be brought closer to the axis 44. This has two advantages.

First, the belts 30 and 32 can move closer to the axis 44 when they are in their radially innermost positions, thus increasing the possible range of drive reduction provided by the pulley assembly 10 between slow speed and high speed. In addition, the bottom clearance can be increased for the belts 30 and 32, so that as they inevitably wear, they can move lower in the grooves 141 and 154, respectively, before they bottom out and start to slip or wear.

Second, or alternatively, the outer diameter of the pulley halves 90–98 can be decreased, thus shortening the moment arm by which lateral forces of the belts 30 and 32 act to cock the center pulley 94 on the shaft 50. This can help to minimize the possibility of the sleeve sticking on the shaft and thus disabling the variable speed pulley assembly 10.

The ratio of the length of the sleeve 120 to the diameter of the sleeve is important in the functioning of the pulley assembly 10. The length of the sleeve 120 is indicated by the dimension A in FIG. 2. The diameter of the sleeve is indicated by the dimension B in FIG. 2. As the ratio of sleeve length to sleeve diameter increases, the sleeve 120 becomes less likely to cock and thereby stick on the shaft 50 under lateral loading.

The outer diameter of the pulley assembly 10 is indicated by the dimension C in FIG. 2, indicating the outermost position of one of the belts 30 and 32 in relation to the pulley assembly. As this dimension C increases, so also does the maximum lateral (sideways) moment arm applied to the center pulley 94 by any side force from one of the belts 30 or 32 in a radially outermost position. If this side force on the center pulley 94 becomes too great, the center pulley and the sleeve 120 will tend to cock and thereby stick on the shaft 50.

It is, therefore, desirable to minimize the dimension C while maximizing the length of the sleeve 120, within the necessary operating range of the pulley assembly 10. This relationship is expressed as the ratio of the outer diameter of the pulley assembly 10 (dimension C) to the first ratio (dimension A to dimension B). Thus, if the belt OD is too great relative to the sleeve length, or the sleeve length is too short relative to its diameter, or a combination of both, the pulley assembly 10 is more likely to experience sticking of the center pulley 94 on the shaft 50.

Applicant has found that it is desirable that the first ratio (dimension A to dimension B, or sleeve length to diameter) is, desirably, greater than about 1.0 to 1. When this is the case, the likelihood of the sleeve 120 detrimentally cocking on the shaft is sufficiently minimized.

Applicant has found that it is desirable that the second ratio (dimension C to the first ratio) is desirably less than about 4.0 to 1. When this is the case, again, the likelihood of the sleeve 120 detrimentally cocking on the shaft 50 is sufficiently minimized that the belt OD can increase while still maintaining freedom from cocking of the sleeve.

The use of galvanized steel for the pulley halves 90–98 enables improved gripping of the belts 30 and 32 on the pulley halves, because the pulley halves do not need to be oiled to prevent rusting.

The fact that the shaft 50 rotates with the inner races 70 and 74 of the bearings 66 and 68, respectively, allows for a simple design in which the second portion 62 of the shaft has a constant diameter, and the shaft has a shoulder 60 to engage the inner race 74 of the one bearing 68. This design also allows easy and quick belt changing by removing the one bolt 82 at the end of the shaft 50.

Figure 3:
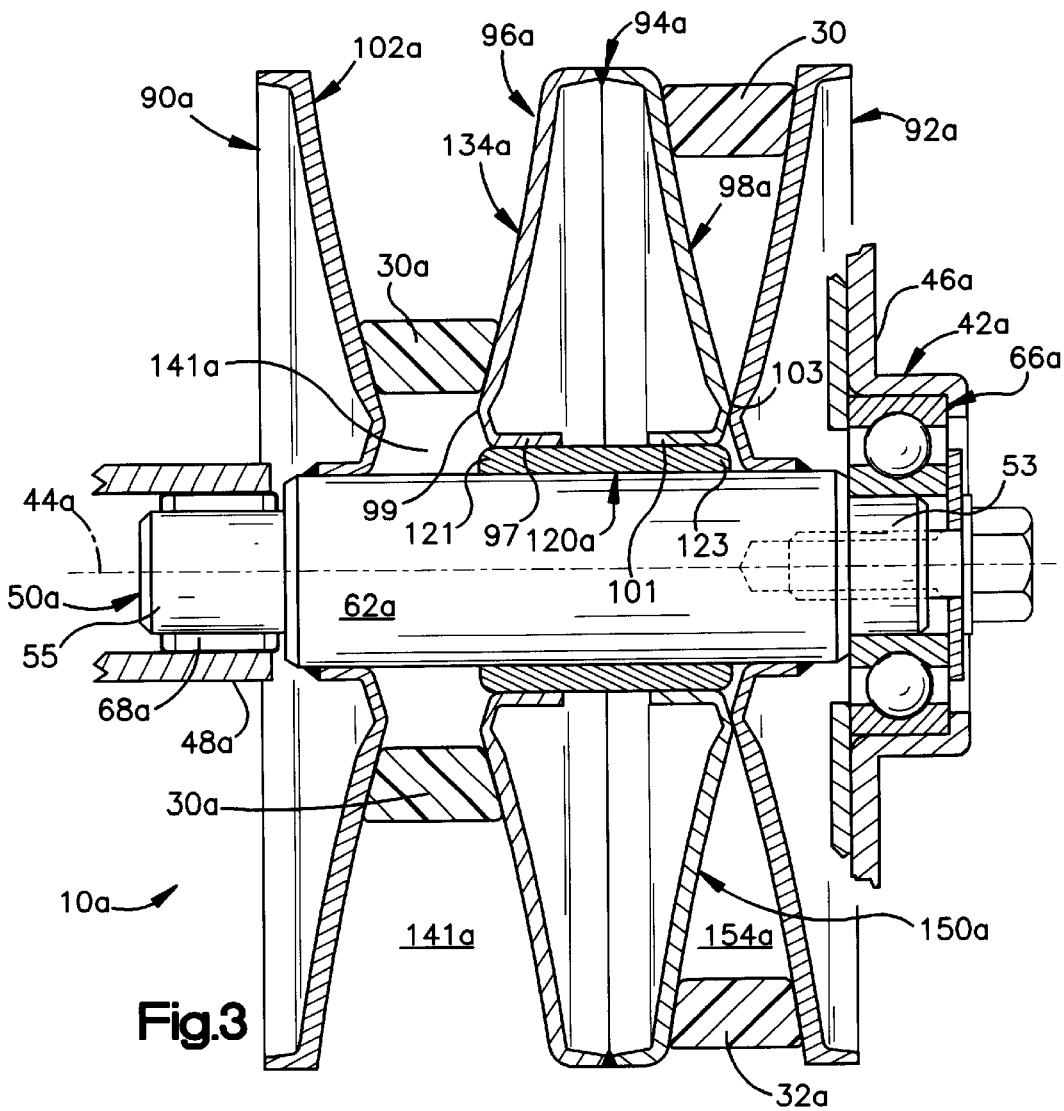
FIG. 3 is a view similar to FIG. 2 of a pulley assembly constructed in accordance with a second embodiment of the present invention.

FIG. 3 illustrates a pulley assembly 10 in accordance with a second embodiment of the present invention. The pulley assembly 10a is similar in construction and operation to the pulley assembly 10 (FIGS. 1–2), and similar parts are given the same reference numerals with the suffix "a" added. The pulley assembly 10a (FIG. 3) is, however, different from the pulley assembly 10 in two ways.

First, the shaft 50a has a different configuration and the bearings 66a and 68a are located at different points along the shaft. Specifically, the first portion 52a of the shaft 50a comprises first and second sections 53 and 55 spaced apart on opposite ends of the second portion 62a. The first section 53 is supported for rotation in the first bearing 66a in the first portion 46a of the support arm 42a. The second section 55 is supported for rotation in the second bearing 68a (a needle bearing) in the second portion 48a of the support arm 42a. As a result, the entire shaft 50a is supported on the bearings 66a and 68a for rotation about the axis 44a relative to the support arm 42a.

The second portion 62a of the shaft 50a again has a constant diameter for its entire length. The outer drive pulley half 90a, the center pulley 94a, and the outer driven pulley half 92*a* are all supported on the constant diameter second portion 62*a* of the shaft 50*a*. The second portion 62*a* of the shaft 50*a* is located axially between the first and second bearings 66*a* and 68*a*.

The second major difference between the pulley assembly 10*a* and the pulley assembly 10 is in the configuration of the center pulley 94*a*. Specifically, the inner drive pulley half 96*a* has a mounting flange 97 that extends axially inward from the axially outermost point 99 of the belt engagement surface 134*a* of the inner drive pulley half. The mounting flange 97 is pressed onto the sleeve 120*a*. The axially outermost point 99 is about even with the one end 121 of the sleeve 120*a*.

Similarly, the inner driven pulley half 98*a* has a mounting flange 101 that extends axially inward from the axially outermost point 103 of the belt engagement surface 150*a* of the inner driven pulley half. The axially outermost point 103 is about even with the other end 123 of the sleeve 120*a*. As a result, the mounting flanges 97 and 101 extend axially inward, toward each other, and do not project axially outward of the ends 121 and 123 of the sleeve 120*a*.

The belt engagement surface 102*a* on the outer drive pulley half 90*a* and the belt engagement surface 134*a* on the inner drive pulley half 96*a* define between them the variable width drive pulley groove 141*a*. The groove 141*a* extends radially inward to the second portion 62*a* of the shaft 50*a*. The radially inner surface of the drive belt 96*a* is presented toward the second portion 62*a* of the shaft 50*a*, through the groove 141*a*. The sleeve 120*a* does not extend into the groove 141*a* between the axially innermost points 99 and 103. Therefore, when the drive belt 30*a* moves radially inward very close to the shaft 50*a*, the sleeve 120*a* is not located between the drive belt and the shaft, and the sleeve 120*a* does not prevent the drive belt from coming closer to the shaft.

This positioning of the sleeve 120*a* relative to the drive belt 30*a* can help allow the drive belt to move closer to the axis 44*a* when it is in its radially innermost position, thus increasing the possible range of drive reduction provided by the pulley assembly 10 between slow speed and high speed. In addition, greater bottom clearance can be provided for the drive belt 30*a*, so that as it inevitably wears, it can move lower in the groove 141*a* before it bottoms out and starts to slip or wear. The same advantages are provided for the driven belt 32*a* also.

From the above description of the invention, those skilled in the art will perceive improvements, changes and modifications in the invention. Such improvements, changes and modifications within the skill of the art are intended to be covered by the appended claims.

Having described the invention, we claim:

1. A variable speed pulley assembly for use with a drive belt having a V-shaped cross-sectional configuration for transmitting driving force to said pulley assembly and a driven belt having a V-shaped cross-sectional configuration for transmitting driving force from said pulley assembly, said pulley assembly being supported on a support member, said pulley assembly comprising:

a shaft supporting said pulley assembly on said support member for rotation with said shaft relative to the support member about an axis;

an outer drive pulley half fixed for rotation with said shaft on a first portion of said shaft having a first diameter;

an outer driven pulley half fixed for rotation with said shaft on a second portion of said shaft spaced apart axially from said first portion and having said first diameter;

a sleeve on a third portion of said shaft axially intermediate said outer drive pulley half and said outer driven pulley half, said sleeve being movable axially in opposite directions along said third portion of said shaft between said outer drive pulley half and said outer driven pulley half, said third portion of said shaft having said first diameter; and a center pulley fixed for rotation with said sleeve, said center pulley comprising an inner drive pulley half and an inner driven pulley half fixed for rotation with each other, said center pulley being rotatable with said outer drive pulley half and said outer driven pulley half about said axis;

said inner drive pulley half and said outer drive pulley half defining between them a drive pulley groove, the drive belt being received in said drive pulley groove and being movable radially in said drive pulley groove between a radially innermost position and a radially outermost position;

said inner driven pulley half and said outer driven pulley half defining between them a driven pulley groove, the driven belt being received in said driven pulley groove and being movable radially in said driven pulley groove between a radially innermost position and a radially outermost position.

2. A pulley assembly as set forth in claim 1 wherein said shaft is formed as one piece and is solid rather than hollow.

3. A pulley assembly as set forth in claim 1 including one or more bearings supporting said shaft for rotation relative to the support member, said bearings having inner races and outer races, said outer races being supported in the support member, said inner races rotating with said shaft relative to the support member.

4. A pulley assembly as set forth in claim 3 wherein said shaft is formed as one piece and has a shoulder engaging said inner race and has a fastener opening for receiving a fastener for pulling said shaft tight against said inner race.

5. A pulley assembly as set forth in claim 3 including one or more bearings supporting said shaft for rotation relative to the support member, said bearings being disposed at a location not radially inward of said pulley halves.

6. A pulley assembly as set forth in claim 5 wherein said pulley halves are located axially between said bearings.

7. A pulley assembly as set forth in claim 5 wherein said bearings are located axially to one side of said pulley halves.

8. A pulley assembly as set forth in claim 1 wherein said sleeve has an axial extent at least as great as the axial extent of said center pulley.

9. A pulley assembly as set forth in claim 1 wherein said outer pulley halves are made from galvanized steel and are welded to said shaft.

10. A pulley assembly as set forth in claim 1 wherein said inner pulley halves are made from galvanized steel and are welded to each other for rotation with each other and with said sleeve.

11. A pulley assembly as set forth in claim 1 wherein at least one of said drive pulley groove and said driven pulley groove has an included angle between the pulley halves which define said one groove which included angle varies between the radially innermost position of the belt in said one groove and the radially outermost position of the belt in said one groove.

12. A pulley assembly as set forth in claim 1 wherein:

said sleeve has a length and an inside diameter; and a first ratio, of said sleeve length to said sleeve diameter, has a value of at least about 1.0 to 1.

13. A pulley assembly as set forth in claim 12 wherein:

said pulley assembly has an outside diameter; and a second ratio, of said outer diameter to the value of said first ratio, has a value which is less than or equal to about 4.0.

14. A pulley assembly as set forth in claim 1 wherein said sleeve is not disposed between said drive belt and said shaft when said drive belt is in its radially innermost position in said drive pulley groove, and said sleeve is not disposed between said driven belt and said shaft when said driven belt is in its radially innermost position in said driven pulley groove.

15. A variable speed pulley assembly for use with a drive belt having a V-shaped cross-sectional configuration for transmitting driving force to said pulley assembly and a driven belt having a V-shaped cross-sectional configuration for transmitting driving force from said pulley assembly, said pulley assembly being supported on a support member, said pulley assembly comprising:

a shaft supporting said pulley assembly on said support member for rotation with said shaft relative to said support member about an axis;

an outer drive pulley half and an outer driven pulley half fixed for rotation with said shaft on first and second portions of said shaft spaced apart axially from each other;

a sleeve on said shaft at a location axially intermediate said outer drive pulley half and said outer driven pulley half, said sleeve being movable axially in opposite directions along a third portion of said shaft between said outer drive pulley half and said outer driven pulley half; and a center pulley fixed for rotation with said sleeve, said center pulley comprising an inner drive pulley half and an inner driven pulley half fixed for rotation with each other, said center pulley being rotatable with said outer drive pulley half and said outer driven pulley half about said axis;

said inner drive pulley half and said outer drive pulley half defining between them a drive pulley groove, the drive belt being received in said drive pulley groove and being movable radially in said drive pulley groove between a radially innermost position and a radially outermost position;

said inner driven pulley half and said outer driven pulley half defining between them a driven pulley groove, the driven belt being received in said driven pulley groove and being movable radially in said driven pulley groove between a radially innermost position and a radially outermost position.

at least one of said drive pulley groove and said driven pulley groove having an included angle between the pulley halves which define said one groove which included angle varies between the radially innermost position of the belt in said one groove and the radially outermost position of the belt in said one groove.

16. A pulley assembly as set forth in claim 15 wherein said first and second and third portions of said shaft all have the same diameter.

17. A pulley assembly as set forth in claim 15 wherein:

said sleeve has a length and an inside diameter; and a first ratio, of said sleeve length to said sleeve diameter, has a value of at least about 1.0 to 1.

18. A pulley assembly as set forth in claim 17 wherein:

said pulley assembly has an outside diameter; and a second ratio, of said outer diameter to the value of said first ratio, has a value which is less than or equal to about 4.0.

19. A pulley assembly as set forth in claim 15 wherein said pulley halves are located axially between said bearings.

20. A pulley assembly as set forth in claim 15 wherein said bearings are located axially to one side of said pulley halves.

21. A pulley assembly as set forth in claim 15 wherein said inner and outer pulley halves are made from galvanized steel and said outer pulley halves are welded to said shaft.

22. A variable speed pulley assembly for use with a drive belt for transmitting driving force to said pulley assembly and a driven belt for transmitting driving force from said pulley assembly, said pulley assembly being supported on a support member, said pulley assembly comprising:

a shaft supporting said pulley assembly on said support member for rotation with said shaft relative to the support member about an axis;

said shaft having a constant diameter portion that is solid and on which an outer drive pulley half and an outer driven pulley half are fixed for rotation with said shaft at locations space apart axially from each other;

a sleeve on said constant diameter portion of said shaft axially intermediate said outer drive pulley half and said outer driven pulley half, said sleeve being movable axially in opposite directions along said constant diameter portion of said shaft; and a center pulley fixed for rotation with said sleeve, said center pulley comprising an inner drive pulley half and an inner driven pulley half fixed for rotation with each other, said center pulley being rotatable with said outer drive pulley half and said outer driven pulley half about said axis;

a bearing assembly clamped in said support member and supporting said shaft for rotation on said support member, said shaft having a shoulder adjacent said bearing assembly; and a screw that pulls said shoulder against said bearing assembly.

* * * * *